United States Patent
Chen et al.

(10) Patent No.: US 8,709,130 B2
(45) Date of Patent: Apr. 29, 2014

(54) METHOD FOR PRODUCING METAL ZIRCONIUM INDUSTRIALLY AND PRODUCING LOW-TEMPERATURE ALUMINUM ELECTROLYTE AS BYPRODUCT

(71) Applicant: Shenzhen Sunxing Light Alloys Materials Co., Ltd, Guangdong (CN)

(72) Inventors: Xuemin Chen, Guangdong (CN); Jun Yang, Guangdong (CN); Zhihong Li, Guangdong (CN); Weiping Wu, Guangdong (CN)

(73) Assignee: Shenzhen Sunxing Light Alloys Materials Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/709,026

(22) Filed: Dec. 9, 2012

(65) Prior Publication Data

US 2013/0091988 A1 Apr. 18, 2013

(30) Foreign Application Priority Data

May 30, 2012 (CN) .......................... 2012 1 0172853

(51) Int. Cl.
*C22B 23/00* (2006.01)
*C22B 34/14* (2006.01)

(52) U.S. Cl.
USPC .................. 75/420; 75/615; 75/686

(58) Field of Classification Search
USPC ............................................ 75/615, 686, 420
See application file for complete search history.

(56) References Cited

U.S. PATENT DOCUMENTS 4,127,409 A * 11/1978 Megy .............................. 75/615
4,437,888 A * 3/1984 Jecker ............................ 75/419

OTHER PUBLICATIONS

Cryolite. (n.d.). Dictionary.com Unabridged. Retrieved Apr. 30, 2013, from Dictionary.com website: http://dictionary.reference.com/browse/Cryolite.*

* cited by examiner

*Primary Examiner* — George Wyszomierski
*Assistant Examiner* — Tima M McGuthry Banks
(74) *Attorney, Agent, or Firm* — Jackson IPG PLLC

(57) ABSTRACT

The invention provides a preparation method for producing metal zirconium industrially and producing low-temperature aluminum electrolyte as byproduct, which comprises the following steps: A) aluminum and fluorozirconate are put in a closed reactor, inert gas is fed into the reactor after evacuation, the reactor is heated up to 780° C. to 1000° C. and then the mixture in the reactor is stirred rapidly; and B) after reaction continues for 4 to 6 hours, the liquid molten at the upper layer is sucked out to obtain low-temperature aluminum electrolyte, and the product at the lower layer is subjected to acid dipping or distillation to remove surface residue to obtain metal zirconium.

8 Claims, No Drawings

METHOD FOR PRODUCING METAL ZIRCONIUM INDUSTRIALLY AND PRODUCING LOW-TEMPERATURE ALUMINUM ELECTROLYTE AS BYPRODUCT

TECHNICAL FIELD OF THE INVENTION

The invention relates to a preparation method of metal zirconium, more particularly to a preparation method for producing metal zirconium industrially and producing low-temperature aluminum electrolyte as byproduct.

BACKGROUND OF THE INVENTION

As a rare metal, zirconium has the features of high melting point, high hardness and strong corrosion resistance and is widely applied in aerospace, military industry, atomic energy and other fields. There are mainly two industrial preparation methods for metal zirconium at present:
(1) Reduction method: under the protection of inert gas, metal zirconium is prepared from raw material, i.e. zirconium tetrachloride, in a reduction way by taking metal magnesium, sodium or the mixture thereof as reducing agent, but this method has the shortcomings of complex reaction equipment and high comprehensive production cost, etc.
(2) Electrolysis method: metal zirconium is prepared from raw material, i.e. $K_2ZrF_6$, by $K_2ZrF_6$—KCl or $K_2ZrF_6$—NaCl electrolyte molten salt electrolysis method, but this method has the shortcomings of high power consumption for electrolysis, low yield of metal zirconium and high production cost; in addition to the $K_2ZrF_6$ molten salt electrolysis method, zirconium can also be prepared in a pure chloride electrolyte system containing $ZrCl_4$, however, this method has the shortcomings of high power consumption for electrolysis and poor quality of product.

SUMMARY OF THE INVENTION

In order to solve the technical problems in the prior art, the inventor has made tremendous researches on selection for raw materials and preparation method and has unexpectedly found that, metal zirconium can be obtained by means of reaction between the raw material, i.e. fluorozirconate, and aluminum, such a preparation method is simple, moderate in reaction conditions, short in reaction period and high in purity of target product, moreover, the byproduct cryolite has good application prospect when used as low-temperature aluminum electrolyte.

The invention provides a method for preparing zirconium from raw material potassium fluozirconate, which comprises the following steps:
A) aluminum and fluorozirconate are put in a closed reactor, inert gas is fed into the reactor after evacuation, the reactor is heated up to 780° C. to 1000° C. and then the mixture in the reactor is rapidly stirred; and
B) after reaction continues for 4 to 6 hours, the liquid molten at the upper layer is sucked out to obtain low-temperature aluminum electrolyte, and the product at the lower layer is subjected to acid dipping or distillation to remove surface residue to obtain metal zirconium.

With the technical proposal above, pure zirconium can be prepared by means of reaction between raw material, i.e. potassium fluozirconate, and aluminum under moderate conditions, such a preparation method is simple and short in reaction period and can realize large-scale industrial production of zirconium; moreover, the byproduct cryolite can reduce the temperature for electrolysis and the power consumption when used as low-temperature aluminum electrolyte in aluminum electrolysis industry, so great application prospect is achieved.

As a further improvement of the invention, the fluorozirconate is selected from potassium fluozirconate or sodium fluozirconate. The chemical reaction formulas involved are as follows:

$$\frac{3}{4}K_2ZrF_6 + Al = \frac{3}{4}Zr + \frac{3}{2}KF \cdot AlF_3;$$

$$\frac{3}{4}Na_2ZrF_6 + Al = \frac{3}{4}Zr + \frac{3}{2}NaF \cdot AlF_3.$$

As a further improvement of the invention, the reaction time is 5 hours. Reaction time is closely related to reaction temperature and reactant amount, and 5-hour reaction time can lead to complete reaction in the case of industrial production at 780° C. to 1000° C.

As a further improvement of the invention, the reaction temperature is from 780 to 850° C.

As a further improvement of the invention, the inert gas is argon.

Compared with the prior art, the invention has the advantages that: the invention provides a method for preparing zirconium from raw material fluorozirconate, which is simple, short in reaction period, moderate in reaction conditions and implementable in large-scale industrial production of zirconium; the byproduct cryolite can reduce the temperature for electrolysis and the power consumption when used as low-temperature aluminum electrolyte in aluminum electrolysis industry, so great application prospect is achieved.

DETAILED DESCRIPTION OF THE EMBODIMENTS

Further detailed description is made below to the invention with reference to the embodiments.

Embodiment 1

1 tons of aluminum and 10.5 tons of potassium fluozirconate are weighed and put in a reactor that is a closed container, argon is fed into the reactor for the purpose of protection after evacuation, the reactor is heated up to 780° C., zirconium and potassium cryolite are generated upon complete reaction after the mixture in the reactor is rapidly stirred for 5 hours, the cover of the reactor is opened and liquid-state potassium cryolite molten at the upper layer is sucked out by a siphon pump. After the reactor is cooled, the product at the lower layer is crushed under the protection of argon and then added with dilute sulfuric acid for soakage to remove potassium cryolite remaining on the surface, and 3.0 tons of pure zirconium is obtained according to weighing after vacuum drying.

Embodiment 2

1 tons of aluminum and 10.5 tons of potassium fluozirconate are weighed and put in a reactor that is a closed container, argon is fed into the reactor for the purpose of protection after evacuation, the reactor is heated up to 850° C., zirconium and potassium cryolite are generated upon complete reaction after the mixture in the reactor is rapidly stirred for 4 hours, the cover of the reactor is opened and liquid-state potassium cryolite molten at the upper layer is sucked out by a siphon pump. After the reactor is cooled, the product is under the protection of argon and then to remove potassium cryolite remaining on the surface, 3.1 tons of pure zirconium is obtained according to weighing after vacuum drying.

Embodiment 3

1 tons of aluminum and 9.3 tons of sodium fluozirconate are weighed and put in a reactor that is a closed container, argon is fed into the reactor for the purpose of protection after evacuation, the reactor is heated up to 800° C., zirconium and sodium cryolite are generated upon complete reaction after the mixture in the reactor is rapidly stirred for 5 hours, the cover of the reactor is opened and liquid-state sodium cryolite molten at the upper layer is sucked out by a siphon pump. After the reactor is cooled, the product at the lower layer is crushed under the protection of argon and then added with dilute sulfuric acid for soakage to remove sodium cryolite remaining on the surface, and 3.0 tons of pure zirconium is obtained according to weighing after vacuum drying.

Embodiment 4

1 tons of aluminum and 9.3 tons of sodium fluozirconate are weighed and put in a reactor that is a closed container, argon is fed into the reactor for the purpose of protection after evacuation, the reactor is heated up to 850° C., zirconium and sodium cryolite are generated upon complete reaction after the mixture in the reactor is rapidly stirred for 4 hours, the cover of the reactor is opened and liquid-state sodium cryolite molten at the upper layer is sucked out by a siphon pump. After the reactor is cooled, the product is under the protection of argon and then to remove sodium cryolite remaining on the surface, 3.1 tons of pure zirconium is obtained according to weighing after vacuum drying.

The contents discussed above are merely for further detailed description of the invention with reference to the preferred embodiments, and it shall not be considered that the embodiments of the invention are limited to the description only. Many simple deductions or substitutions could be made without departing from the concept of the invention by ordinary skilled in the art to which the invention pertains, and shall be contemplated as being within the scope of the invention.

What is claimed is:

1. A preparation method for producing metal zirconium and producing low-temperature aluminum electrolyte as byproduct consisting of:

A) placing a mixture consisting essentially of aluminum and fluorozirconate in a closed reactor, feeding inert gas into the reactor after evacuation, heating the reactor up to a reaction temperature of 780 to 1000° C. and then stirring the mixture in the reactor; and B) after reaction continues for a reaction time of 4 to 6 hours, sucking out liquid at an upper layer to obtain low-temperature aluminum electrolyte, and subjecting product at a lower layer to acid dipping or distillation to remove surface residue to obtain metal zirconium.

2. The preparation method for producing metal zirconium and producing low-temperature aluminum electrolyte as byproduct according to claim 1, wherein the reaction time is 5 hours.

3. The preparation method for producing metal zirconium and producing low-temperature aluminum electrolyte as byproduct according to claim 2, wherein the reaction temperature is from 780° C. to 850° C.

4. The preparation method for producing metal zirconium and producing low-temperature aluminum electrolyte as byproduct according to claim 3, wherein the inert gas is argon.

5. The preparation method for producing metal zirconium and producing low-temperature aluminum electrolyte as byproduct according to claim 1, wherein the fluorozirconate is selected from the group consisting of potassium fluozirconate and sodium fluozirconate.

6. The preparation method for producing metal zirconium and producing low-temperature aluminum electrolyte as byproduct according to claim 5, wherein the reaction time is 5 hours.

7. The preparation method for producing metal zirconium and producing low-temperature aluminum electrolyte as byproduct according to claim 6, wherein the reaction temperature is from 780° C. to 850° C.

8. The preparation method for producing metal zirconium and producing low-temperature aluminum electrolyte as byproduct according to claim 7, wherein the inert gas is argon.

* * * * *